(12) United States Patent
Vandermeijden

(10) Patent No.: US 9,563,319 B2
(45) Date of Patent: Feb. 7, 2017

(54) CAPACITIVE SENSING WITHOUT A BASELINE

(71) Applicant: Synaptics Incorporated, San Jose, CA (US)

(72) Inventor: Tom Vandermeijden, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 92 days.

(21) Appl. No.: 14/576,022

(22) Filed: Dec. 18, 2014

(65) Prior Publication Data

US 2016/0179241 A1  Jun. 23, 2016

(51) Int. Cl.
G06F 3/044 (2006.01)
G06F 3/0488 (2013.01)

(52) U.S. Cl.
CPC ..................................... G06F 3/044 (2013.01)

(58) Field of Classification Search
CPC ........ G06F 3/044; G06F 3/0488; G06F 3/045; G06F 3/012
See application file for complete search history.

(56) References Cited

U.S. PATENT DOCUMENTS

| | | | |
|---|---|---|---|
| 7,656,393 B2 | 2/2010 | King et al. | |
| 8,106,893 B2 | 1/2012 | Fujita et al. | |
| 8,125,232 B2 | 2/2012 | Ozawa | |
| 8,149,226 B2 | 4/2012 | Oki | |
| 8,451,234 B2 | 5/2013 | Sato et al. | |
| 8,730,189 B2 | 5/2014 | Mamba et al. | |
| 9,262,017 B2* | 2/2016 | Kobayashi | G06F 3/0416 |
| 2010/0287470 A1 | 11/2010 | Homma et al. | |
| 2010/0292945 A1* | 11/2010 | Reynolds | G06F 3/044 702/65 |
| 2011/0261007 A1 | 10/2011 | Joharapurkar et al. | |
| 2012/0120004 A1 | 5/2012 | Chang et al. | |
| 2012/0306802 A1 | 12/2012 | McCracken | |
| 2012/0319994 A1 | 12/2012 | Hatano | |
| 2013/0002579 A1 | 1/2013 | Hatano | |
| 2013/0050126 A1* | 2/2013 | Kimura | G02F 1/13338 345/173 |
| 2013/0257785 A1 | 10/2013 | Brown et al. | |
| 2013/0257786 A1 | 10/2013 | Brown et al. | |
| 2014/0022202 A1 | 1/2014 | Badaye et al. | |

(Continued)

*Primary Examiner* — Ricardo L Osorio
(74) *Attorney, Agent, or Firm* — Osha Liang LLP

(57) ABSTRACT

A processing system for a capacitive sensing device, including: a sensor module coupled to multiple sensor electrodes and configured to receive multiple resulting signals from the multiple sensor electrodes, where the multiple electrodes includes a first sensor electrode, a second sensor electrode adjacent to the first second electrode, a third sensor electrode adjacent to the first sensor electrode and the second sensor electrode, and a fourth sensor electrode adjacent to the third sensor electrode; and a determination module configured to: determine, based on the multiple resulting signals, first differential capacitive sensing data between the first sensor electrode and the second sensor electrode; determine, based on the multiple resulting signals, second differential capacitive sensing data between the third sensor electrode and the fourth sensor electrode; and determine user contact information based on at least one of the first differential capacitive sensing data and the second differential capacitive sensing data.

19 Claims, 5 Drawing Sheets

(56) References Cited

U.S. PATENT DOCUMENTS

| | | | |
|---|---|---|---|
| 2014/0160063 A1 | 6/2014 | Yairi et al. | |
| 2015/0192989 A1* | 7/2015 | Kim | G06F 3/011 345/156 |
| 2015/0193041 A1* | 7/2015 | Shepelev | G06F 3/044 345/174 |
| 2015/0286330 A1* | 10/2015 | Shepelev | G06F 3/044 345/174 |
| 2015/0378495 A1* | 12/2015 | Losh | G06F 3/044 345/174 |
| 2016/0109991 A1* | 4/2016 | Oh | G06F 3/047 345/174 |

* cited by examiner

CAPACITIVE SENSING WITHOUT A BASELINE

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as notebooks or desktop computers). Proximity sensor devices are also often used in smaller computing systems (such as cellular/mobile phones).

SUMMARY

In one aspect, embodiments of the invention relate to a processing system for a capacitive sensing device. The processing system comprises a sensor module coupled to a plurality of sensor electrodes and configured to receive a first plurality of resulting signals from the plurality sensor electrodes, wherein the plurality of sensor electrodes comprises a first sensor electrode, a second sensor electrode adjacent to the first second electrode, a third sensor electrode adjacent to the first sensor electrode and the second sensor electrode, and a fourth sensor electrode adjacent to the third sensor electrode. The processing system also comprises a determination module configured to: determine, based on the first plurality of resulting signals, first differential capacitive sensing data between the first sensor electrode and the second sensor electrode; determine, based on the first plurality of resulting signals, second differential capacitive sensing data between the third sensor electrode and the fourth sensor electrode; and determine user contact information based on at least one of the first differential capacitive sensing data and the second differential capacitive sensing data.

In one aspect, embodiments of the invention relate to a method for operating a capacitive sensing device. The method comprises: receiving a plurality of resulting signals from a plurality of sensor electrodes, wherein the plurality of sensor electrodes comprises a first sensor electrode, a second sensor electrode adjacent to the first second electrode, a third sensor electrode adjacent to the first sensor electrode and the second sensor electrode, and a fourth sensor electrode adjacent to the third sensor electrode. The method also comprises: determining, based the first plurality of resulting signals, first differential capacitive sensing data between the first sensor electrode and the second sensor electrode; determining, based on the first plurality of resulting signals, second differential capacitive sensing data between the third sensor electrode and the fourth sensor electrode; and determining user contact information based on at least one of the first differential capacitive sensing data and the second differential capacitive sensing data.

In one aspect, embodiments of the invention relate to an input device. The input device comprises: a plurality of sensor electrodes comprising: a first sensor electrode; a second sensor electrode adjacent to the first second electrode; a third sensor electrode adjacent to the first sensor electrode and the second sensor electrode; and a fourth sensor electrode adjacent to the third sensor electrode. The input device also comprises a processing system operatively connected to the plurality of sensor electrodes and configured to: determine, based the first plurality of resulting signals, first differential capacitive sensing data between the first sensor electrode and the second sensor electrode; determine, based on the first plurality of resulting signals, second differential capacitive sensing data between the third sensor electrode and the fourth sensor electrode; and determine user contact information based on at least one of the first differential capacitive sensing data and the second differential capacitive sensing data.

Other aspects of the invention will be apparent from the following description and the appended claims.

DETAILED DESCRIPTION

Figure 1:
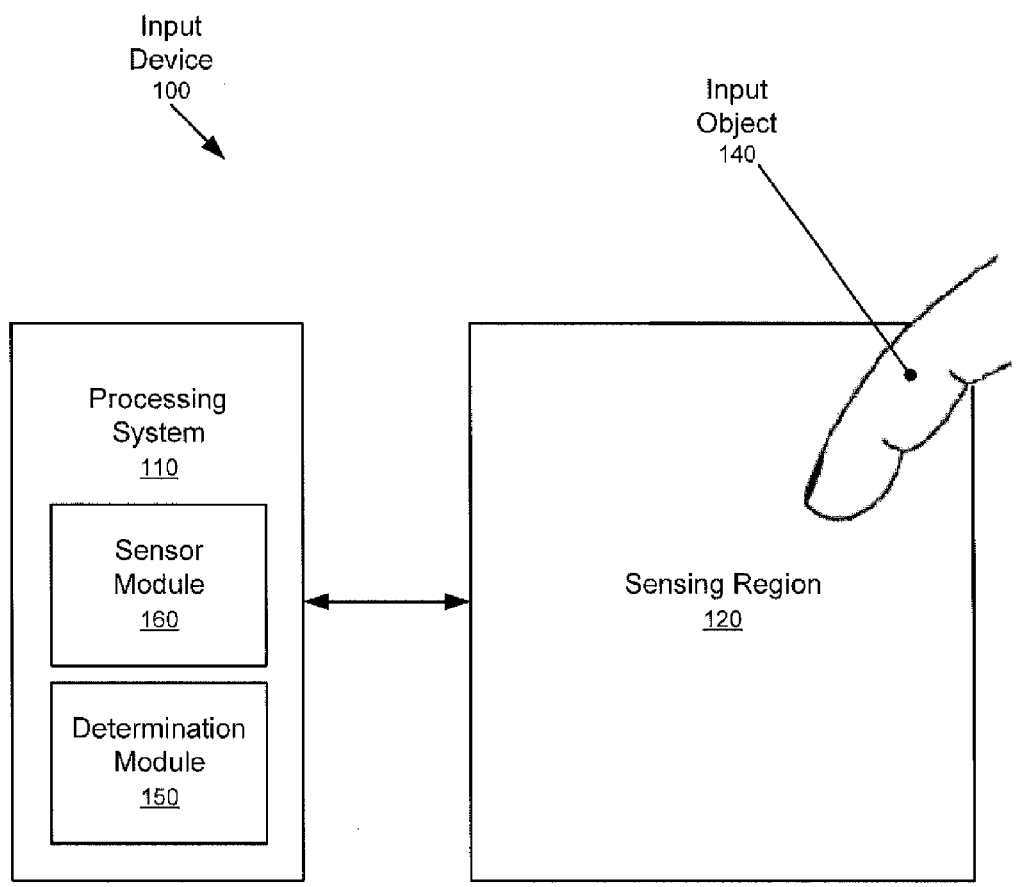
FIG. 1 shows a schematic diagram of a system in accordance with one or more embodiments of the invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is used to distinguish between the elements. By way of an example, a first element is distinct from a second element, and the first element may encompass more than one element and succeed the second element in an ordering of elements.

One or more embodiments of the invention are directed towards detecting user contact with one or more capacitive buttons, without relying on a baseline. It should be noted that, though the term contact is used throughout the specification, physical user contact may not be necessary to detect user presence and determine corresponding contact information. An input device may detect the proximity of a input object to the sensor electrodes or capacitive buttons without physical contact being made. Contact may refer to the presence of an input object in the sensing region of one more sensor electrodes of the input device, without physical contact with the any of the sensor electrodes or capacitive buttons. Typically, it is difficult for an input device to detect the presence of input objects when powering on due to the lack of a known good baseline. That is, the input device compares changes in capacitance in order to determine presence of input objects, but this is difficult to do without knowing whether an input object was present in the measurements which the measured capacitance is being compared to. By utilizing differential capacitive sensing and comparing adjacent, similarly disposed, sensor electrodes, the problems introduced by lacking a known baseline can be mitigated. The buttons may be composed of multiple sensor electrodes. In one or more embodiments, each sensor electrode belongs to a matched pair of sensor electrodes. The measured self-capacitances of the sensor electrodes and/or the measured mutual capacitances between the sensor electrodes may be used to determine user contact with the buttons. These buttons may be located on a side of a mobile device and thus the user may make contact with the buttons when the user is gripping the mobile device. The screen of the mobile device may be powered-on in response to user contact with the buttons. Additionally, user contact with the buttons may be analyzed to determine how the user is holding the mobile device. For example, it may be determined that the user is holding the mobile device in their right hand. In some cases, the user interface of the mobile device may be modified depending on which hand is holding the mobile device.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular/mobile phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module (150) may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers, as shown in FIG. 1, and styli. Throughout the Specification, the singular form of input object is used. Although the singular form is used, multiple input objects exist in the sensing region (120). Further, which particular input objects are in the sensing region may change over the course of the gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

Sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling.

In one implementation, a trans capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may include effect(s) corresponding to one or more transmitter signals, and/or to one or more sources of environmental interference (e.g. other electromagnetic signals). Sensor electrodes may be dedicated transmitters or receivers, or may be configured to both transmit and receive. Measurements acquired using mutual capacitance sensing methods may be referred to as mutual capacitance measurements.

Regardless of whether mutual capacitance or absolute capacitance sensing methods are used, modulating the sensor electrodes may be referred to as driving the sensor electrode with varying voltage signal or exciting a sensor electrode. Conversely, sensor electrodes may be connected to a ground (e.g., system ground or any other ground). Connecting the sensor electrodes to a ground or holding electrodes substantially constant may be referred to a connecting the sensor electrodes to a constant voltage signal. In other words, a constant voltage signal includes a substantially constant voltage signal without departing from the scope of the invention. Further, the sensor electrodes may be of varying shapes and/or sizes. The same shapes and/or sizes of sensor electrodes may or may not be in the same groups. For example, in some embodiments, receiver electrodes may be of the same shapes and/or sizes while in other embodiments receiver electrodes may be varying shapes and/or sizes.

Figure 2:
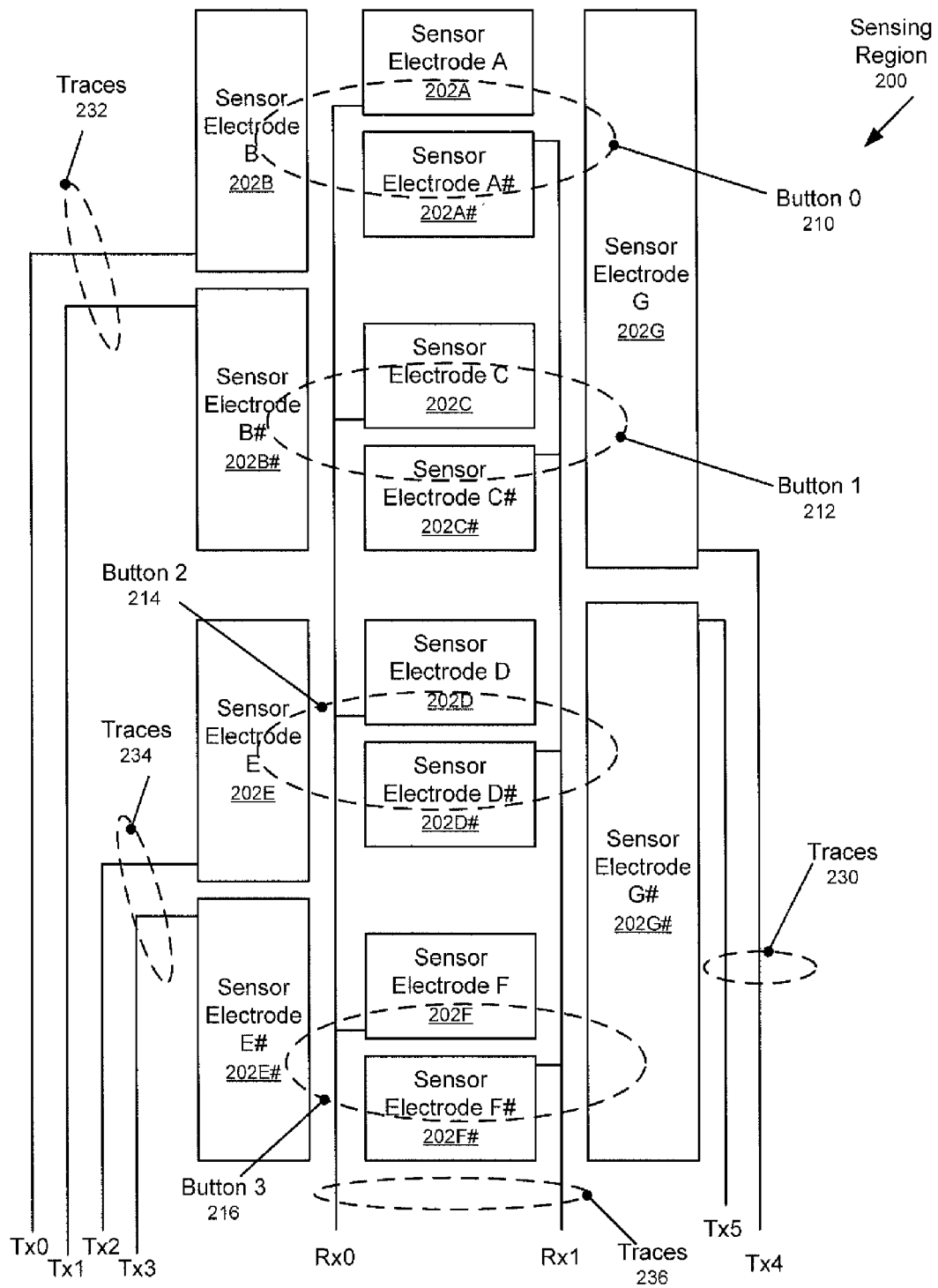
FIG. 2 shows a sensing region with multiple electrodes in accordance with one or more embodiments of the invention.

FIG. 2 shows a sensing region (200) in accordance with one or more embodiments of the invention. The sensing region (200) may correspond to sensing region (120), discussed above in reference to FIG. 1. In some embodiments, the sensing region (200) may be located on a side of a mobile device. As shown in FIG. 2, the sensing region (200) includes multiple sensor electrodes: sensor electrode A (202A), sensor electrode A# (202A#), sensor electrode B (202B), sensor electrode B# (202B#), sensor electrode C (202C), sensor electrode C# (202C#), sensor electrode D (202D), sensor electrode D# (202D#), sensor electrode E (202E), sensor electrode E# (202E#), sensor electrode F (202F), sensor electrode F# (202F#), sensor electrode G (202G), and sensor electrode G# (202G#). Although the sensor electrodes (202A-202G, 202A#-202G#) are shown as rectangles in FIG. 2, the sensor electrodes may be of any shape and size. Moreover, the sensor electrodes (202A-202G, 202A#-202G#) may be composed of any material and may be located in a single layer or in multiple layers.

In one or more embodiments, the sensor electrodes (202A-202G, 202A#-202G#) of the sensing region (200) are grouped into pairs. For example, sensor electrode A (202A) and sensor electrode A# (202A#) are an electrode pair in the sensing region (200). As another example, sensor electrode B (202B) and sensor electrode B# (202B#) are an electrode pair in the sensing region (200). As yet another example, sensor electrode G (202G) and sensor electrode G# (202G#) are an electrode pair in the sensing region (200). In one or more embodiments, the two sensor electrodes within an electrode pair are matched. In other words, the two sensor electrodes within an electrode pair are in close proximity (e.g., adjacent) to each other and are substantially identical in size, shape, and material composition. Further, the two sensor electrodes within an electrode pair have substantially the same background capacitance and saturation capacitance. Further still, the traces connecting the two electrodes in the electrode pair have substantially parallel routings. For example, traces (234) are substantially parallel and connect to the matched pair of sensor electrode E (202E) and sensor electrode E# (202E#). As another example, traces (232) are substantially parallel and connect to the matched pair of sensor electrode B (202B) and sensor electrode B# (202B#). As another example, traces (230) are substantially parallel and connect to the matched pair of sensor electrode G (202G) and sensor electrode G# (202G#). As yet another example, traces (236) are substantially parallel and connected to several matched pairs of sensor electrodes.

Having similar or substantially identical size, shape, material composition and trace routing may each contribute to a pair of sensor electrodes responding similarly to changes in temperature, humidity, aging, voltage fluctuations. In one or more embodiments of the invention, the sensor electrodes in a matched pair tend to track each-other closely over temperature changes, humidity changes, aging, and potentially other factors. For example, over a wide temperature range, a variance less than 10% of finger-saturation capacitance is achievable. This is important, for example, when measuring the mutual capacitance between two sensor electrodes or comparing absolute capacitance measured at two sensor electrodes. If the sensor electrodes do not have similar characteristics that cause their measured capacitance to shift similarly in response to changing conditions over time, it is difficult to rely on capacitance measurements comparing the two in order to detect the presence of an input object near the sensor electrodes.

Still referring to FIG. 2, the sensing region (200) has multiple buttons: Button 0 (210), Button 1 (212), Button 2 (214), and Button 3 (216). Each button (210, 212, 214, 216) is an area that may come into contact with the user's finger, palm, grip, etc. A user may make contact with multiple buttons simultaneously. A button might or might not be visible/detectable to the user. In other words a button might or might not have a different color, texture, etc. than the material/surface surrounding the button.

In one or more embodiments of the invention, a button partially (or fully) covers one or more sensor electrodes. As shown in FIG. 2, button 0 (210) partially covers sensor electrode A (202A), sensor electrode A# (202A#), sensor electrode B (202B), and sensor electrode G (202G). As another example, Button 1 (212) partially covers sensor electrode C (202C), sensor electrode C# (202C#), sensor electrode B (202B), and sensor electrode G (202G). As yet another example, button 2 (214) partially covers sensor electrode D (202D), sensor electrode D# (202D#), sensor electrode E (202E), and sensor electrode G# (202G#). In one or more embodiments, a button is designated as comprising a set of sensor electrodes and the input device determines whether a finger is present on the button by analyzing one or more of the sensor electrodes that make up the button. Further, while a button may be referred to as covering one or more sensor electrodes, this may mean that the button merely consists of those sensor electrodes rather than any physical button or button indication being present over the sensor electrodes on the input device.

In one or more embodiments of the invention, when a user makes contact (e.g., places a finger on) with a button, the measured self-capacitance (absolute capacitance) of each sensor electrode covered by the button changes. For example, the placement of a finger on button 0 (210) will change the self-capacitance (absolute capacitance) of sensor electrode A (202A), sensor electrode A# (202A#), sensor electrode B (202B), and sensor electrode G (202G). In some cases a finger on button 0 (210) may not be large enough, or centered enough, to cover all of the sensor electrodes comprising button 0.

In one or more embodiments of the invention, if a finger covers equally both sensor electrodes in a matched pair, the measured self-capacitance (absolute capacitance) of each sensor electrode in the matched pair will change by the same amount. For example, if a user's finger makes contact with button 0 (210) and the finger covers, equally, both sensor electrode A (202A) and sensor electrode A# (202A#), the self-capacitance of electrode A (202A) and the self-capacitance of electrode A# (202A#) would change by substantially equal amounts. Accordingly, the difference between the two self-capacitance measurements would be approximately zero.

In one or more embodiments of the invention, if a finger does not cover equally both sensor electrodes in a matched pair, the measured self-capacitance (absolute capacitance) of each sensor electrode in the matched pair will change by different amounts. For example, if a user's finger makes contact with button 0 (210) and covers, unequally, both sensor electrode A (202A) and sensor electrode A# (202A#), the self-capacitance of electrode A (202A) would change by a different amount than the self-capacitance of electrode A# (202A#). This difference in self-capacitance measurements may be used to detect/determine user contact with button 0 (210) (discussed below). It should be noted that in some instances, there is some expected difference in self-capacitance, even if the two electrodes are covered equally, due to variations in manufacturing and changes due to temperature, age, etc. Therefore, the threshold to detect the presence of an input object when analyzing the difference between two adjacent sensor electrodes may be greater than zero.

As another example, although sensor electrode B (202B) is partially covered by button 0 (210), sensor electrode B# (202B#) is not covered by button 0 (210). Thus, the self-capacitance of sensor electrode B (202B) would be strongly affected by user contact with button 0 (210), while the self-capacitance of sensor electrode B# (202B#) would be less affected by user contact with button 0 (210). This difference in self-capacitance measurements may be used to detect/determine user contact with button 0 (210). Additionally or alternatively, this difference in self-capacitive measurements may be used with the difference in self-capacitive measurements between the pair of sensor electrodes (202A, 202A#) to confirm or refute the presence (or absence) of user contact. This is particularly useful when, e.g., an input object interacts similarly with sensor electrodes A (202A) and A# (202A#) due to contacting the sensor electrodes equally. When the sensor electrodes A (202A) and A# (202A#) are contacted equally, it is unclear whether an input object is located at button 0 based on that information alone without a baseline. To resolve this ambiguity, the self-capacitance of sensor electrodes B (202B) and B# (202B#) may be compared. Even if the entirety of the button is covered by the input object, there will be difference in self-capacitance measurements of electrodes B (202B) and B# (202B#).

In one or more embodiments of the invention, when a user makes contact (e.g., places a finger on) with a button, the mutual capacitance (trans capacitance) between sensor electrodes changes. For example, the placement of a finger on button 0 (210) changes the mutual capacitance between sensor electrode B (202B) and sensor electrode A (202A). Similarly, the mutual capacitance between sensor electrode B (202B) and sensor electrode A# (202A#) would also change. The differences in these mutual capacitance measurements may be used to detect/determine user contact with button 0 (210) (discussed below). Additionally or alternatively, these differences in mutual capacitance may be used with the changes in self-capacitance to detect/determine user contact with button 0 (210).

As shown in FIG. 2, traces (232) includes trace Tx0 and trace Tx1. Let AbsTx0 and AbsTx1 be the self-capacitance measured from resulting signals on trace Tx0 and Tx1, respectively. Traces (234) include trace Tx2 and trace Tx3, let AbsTx2 and AbsTx3 be the self-capacitance measured from resulting signals on trace Tx2 and Tx3, respectively. Traces (230) include trace Tx4 and Tx5. Let AbsTx4 and AbsTx5 be the self-capacitance measured from resulting signals on trace Tx4 and Tx5, respectively. Those skilled in the art, having the benefit of this detailed description, will appreciate that AbsTx0, AbsTx1, AbsTx2, AbsTx3, AbsTx4, and AbsTx5 represent the self-capacitance (absolute capacitance) of sensor electrode B (202B), sensor electrode B# (202B#), sensor electrode E (202E), and sensor electrode E# (202E#), sensor electrode G (202G), and sensor electrode G# (202G#), respectively.

Traces (236) includes trace Rx0 and trace Rx1. Let AbsRx0 and AbsRx1 be the self-capacitance measured from resulting signals on trace Rx0 and Rx1, respectively. As trace Rx0 is connected to sensor electrode A (202A), sensor electrode C (202C), sensor electrode D (202D), and sensor electrode F (202F), AbsRx0 is influenced by the self-capacitance (absolute capacitance) of those sensor electrodes (202A, 202C, 202D, 202F). As trace Rx1 is connected to sensor electrode A# (202A#), sensor electrode C# (202C#), sensor electrode D# (202D#), and sensor electrode F# (202F#), AbsRx1 is influenced by the self-capacitance (absolute capacitance) of those sensor electrodes (202A#, 202C#, 202D#, 202F#).

In one or more embodiments, the mutual capacitance between two sensor electrodes is measured by driving a transmitting signal to one of the sensor electrodes and observing the resulting signal from the second electrode. Let TransButton0a be the mutual capacitance measured by driving sensor electrode B (202B) and observing the resulting signal on trace Rx0 connected to sensor electrode A (202A). Let TransButton0b be the mutual capacitance measured by driving sensor electrode B (202B) and observing the resulting signal on trace Rx1 connected to sensor electrode A# (202A#).

Let TransButton1a be the mutual capacitance measured by driving sensor electrode B# (202B#) and observing the resulting signal on trace Rx0 connected to sensor electrode C (202C). Let TransButton1b be the mutual capacitance measured by driving sensor electrode B# (202B#) and observing the resulting signal on trace Rx1 connected to sensor electrode C# (202C#).

Let TransButton2a be the mutual capacitance measured by driving sensor electrode E (202E) and observing the resulting signal on trace Rx0 connected to sensor electrode D (202D). Let TransButton2b be the mutual capacitance measured by driving sensor electrode E (202E) and observing the resulting signal on trace Rx1 connected to sensor electrode D# (202D#).

Let TransButton3a be the mutual capacitance measured by driving sensor electrode E# (202E#) and observing the resulting signal on trace Rx0 connected to sensor electrode F (202F). Let TransButton3b be the mutual capacitance measured by driving sensor electrode E# (202E#) and observing the resulting signal on trace Rx1 connected to sensor electrode F# (202F#).

Although FIG. 2 only shows 14 sensor electrodes and four buttons, the pattern shown in FIG. 2 may be repeated/scaled to any number of sensor electrodes and buttons.

Now referring back to FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes). In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to sensing element(s) of input device (100), and one or more components elsewhere. For example, the input device (100) may be a peripheral coupled to a desktop computer, and the processing system (110) may include software configured to run on a central processing unit of the desktop computer and one or more ICs (perhaps with associated firmware) separate from the central processing unit. As another example, the input device (100) may be physically integrated in a smart phone, and the processing system (110) may include circuits and firmware that are part of a main processor of the smart phone. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The sensor module (160) may include functionality to receive resulting signals from the sensor electrodes of the sensing region (120). The self-capacitance (or absolute capacitance) of one or more sensor electrodes in the sensing region (120) may be measured from the resulting signals. Additionally or alternatively, the mutual capacitance (or trans capacitance) between electrodes in the sensing region (120) may be measured from the resulting signals. The sensor module (160) may include, for example, a transmitter module and a receiver module. The transmitter module may include transmitter circuitry to drive the sensor electrodes (e.g., to measure mutual capacitance), while the receiver module may include receiver circuitry to receive the resulting signals.

In one or more embodiments, the determination module (150) includes functionality to determine, based on the resulting signals, the self-capacitance measurements AbsRx0, AbsRx1, AbsTx0, AbsTx1, AbsTx2, AbsTx3, AbsTx4, and AbsTx5 (discussed above in reference to FIG. 2). In one or more embodiments, the determination module (150) includes functionality to determine, based on the resulting signals, the mutual capacitance measurements TransButton0a, TransButton0b, TransButton1a, TransButton1b, TransButton2a, TransButton2b, TransButton3a, and TransButton3b (discussed above in reference to FIG. 2).

In one or more embodiments of the invention, the determination module (150) is configured to determine differential capacitive sensing data between sets of sensor electrodes. For example, the determination module (150) may calculate the following differential capacitive sensing data items:

SAbsDeltaButtons0123$a$=AbsRx0−AbsRx1

SAbsDeltaButtons01=AbsTx0−AbsTx1

SAbsDeltaButtons23=AbsTx2−AbsTx3

SAbsDeltaButtons0123$b$=AbsTx4−AbsTx5

TransDeltaButton0=TransButton0$a$−TransButton0$b$

TransDeltaButton1=TransButton1$a$−TransButton1$b$

TransDeltaButton2=TransButton2$a$−TransButton2$b$

TransDeltaButton3=TransButton3$a$−TransButton3$b$

In one or more embodiments, the determination module (150) includes functionality to compare differential capacitive sensing data with one or more thresholds to determine user contact information (e.g., the number/identity of buttons being touched, which of the user's hands is touching the buttons, etc.) with the sensor region (120). Moreover, this determination is executed without a known baseline. Two examples are provided to explain how the various differential capacitive sensing data items and thresholds may be used to detect user contact with a button of the sensor region (120). However, embodiments of the invention are not limited to these two examples.

Example 1

In the first example, only the differences between the self-capacitance measurements are of interest. Consider button 0 (210), discussed above in reference to FIG. 2. If a user's finger makes contact with button 0 (210) without saturating (or equally straddling) both sensor electrode A (202A) and sensor electrode A# (202A#), SAbsDeltaButtons0123$a$ will satisfy (e.g., exceed) a predefined threshold, indicating there is user contact with button 0 (210). Button 0 (210) also partially covers sensor electrode B (202B), which is matched with sensor electrode B# (202B#). Accordingly, SAbsDeltaButtons01 will also satisfy (e.g., exceed) the same (or different) threshold, confirming the user is touching button 0 (210).

In the event that the user's finger makes contact with button 0 (210), but saturates (or equally straddles) both sensor electrode A (202A) and sensor electrode A# (202A#), SAbsDeltaButtons0123$a$ might not satisfy (i.e., may be less than) the predefined threshold, falsely indicating that there is no user contact with button 0 (210). However, SAbsDeltaButtons01 will still satisfy (e.g., exceed) the same (or a different) threshold indicating that there is contact with the user. The sign of SAbsDeltaButtons01 may be utilized to determine whether it is button 0 (210) or button 1 (212) that is being touched. Accordingly, differential capacitive sensing data for two sets of sensor electrodes may be needed to correctly determine user contact with button 0 (210).

It is possible that while making contact with button 0 (210), the user saturates (or equally straddles) both sensor electrode A (202A) and sensor electrode A# (202A#), and saturates (or equally straddles) both sensor electrode B (202B) and sensor electrode B# (202B#). In such a scenario, neither SAbsDeltaButtons0123*a* nor SAbsDeltaButtons01 will satisfy their respective thresholds, falsely indicating there is no user contact. However, Button 0 (210) also partially covers sensor electrode G (202G), which is matched with sensor electrode G# (2020#). Accordingly, SAbsDeltaButtons0123*b* will satisfy (e.g., exceed) the same (or different) threshold, indicating that the user is touching button 0 (210). In other words, differential capacitive sensing data for three sets of sensor electrodes may be needed to correctly determine user contact with button 0 (210).

Although the above example focuses on button 0 (210), this example may be extended to all buttons in the sensing region (120).

Example 2

In the second example, differences between the mutual capacitance measurements and the self-capacitance measurements are of interest. As a second example, the determination module (210) may first calculate the absolute value of each differential capacitive sensing data item: |SAbsDeltaButtons0123*a*|, |SAbsDeltaButtons01|, |SAbsDeltaButtons23|, |SAbsDeltaButtons0123*b*|, |TransDeltaButton0|, |TransDeltaButton1|, |TransDeltaButton2|, and |TransDeltaButton3|. If at least one of these absolute values exceeds a predefined touch threshold, then it is determined that user contact exists (although the actual button being touched might not yet be identified/isolated). If none of these absolute values exceeds the predefined touch threshold, then no user contact is declared.

Then, if one or more of |TransDeltaButton0|, |TransDeltaButton1|, |TransDeltaButton2|, and |TransDeltaButton3| exceed a predefined threshold, it is determined that the user is making contact with the corresponding button(s). In other words, |TransDeltaButton0|, |TransDeltaButton1|, |TransDeltaButton2|, and |TransDeltaButton3| are used to identify/isolate the button(s) that are being touched/pressed by the user.

Those skilled in the art, having the benefit of this detailed description, will appreciate that if a finger is saturating (or equally straddling) both sensor electrodes in a matched pair of sensor electrodes covered by a button, it is possible that none of |TransDeltaButton0|, |TransDeltaButton1|, |TransDeltaButton2|, and |TransDeltaButton3| will exceed the threshold, even though the user is making contact with a button. In such embodiments, the touched button may be identified/isolated by |SAbsDeltaButtons01| or |SAbsDeltaButtons23|. If |SAbsDeltaButtons01| exceeds a threshold, the sign of SAbsDeltaButtons01 determines whether it is button 0 (210) or button 1 (212) that is being touched/pressed by the user. If |SAbsDeltaButtons23| exceeds the threshold, the sign of SAbsDeltaButtons23 determines whether it is button 2 (214) or button 3 (216) that is being touched/pressed by the user.

One or more actions may be triggered in response to identifying user contact. For example, assuming the sensing region is located on a mobile device, user contact may trigger the mobile device or the touch screen of the mobile device to be activated. Additionally or alternatively, user contact may trigger the rearrangement of GUI widgets (e.g., icons, menus, etc.) on the touchscreen of the mobile device to make the widgets more accessible to the hand (e.g., left hand vs. right hand) that is gripping the mobile device.

As discussed above, embodiments of the invention are not limited to these two examples. In other embodiments, only the differences between the mutual capacitance measurements are of interest.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures such as mode changing gestures, and mode changing modules for changing operation modes.

In some embodiments, the processing system (110) responds to user input (or lack of user input) in the sensing region (120) directly by causing one or more actions. Example actions include changing operation modes (e.g., powering on a screen or touchscreen), as well as graphical user interface (GUI) actions such as cursor movement, rearrangement of icons, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

In some embodiments, the input device (100) is implemented with additional input components that are operated by the processing system (110) or by some other processing system. These additional input components may provide redundant functionality for input in the sensing region (120), or some other functionality. These input connections may include mechanical buttons, sliders, balls, wheels, switches, and the like. Conversely, in some embodiments, the input device (100) may be implemented with no other input components.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Although FIG. 1 shows a single sensing region (120) connected to the processing system (110), in other embodiments of the invention, multiple sensing regions may be connected to the same processing system (110). These multiple sensing regions may share traces. For example, the processing system (110) and two sensing regions connected to the processing system (110) may be located in a mobile device. Each of the multiple sensing regions may be located within/along a different side of the mobile device. When the user grips the mobile device, the processing system (110) may determine which of the user's hands (e.g., left hand vs. right hand) is being used to grip the mobile device. Moreover, in response to detecting user contact with the buttons, the touchscreen of the mobile device may be activated and/or GUI widgets (e.g., icons, menus, etc.) displayed on the screen may be rearranged to facilitate the thumb or fingers of the user's hand.

Figure 3:
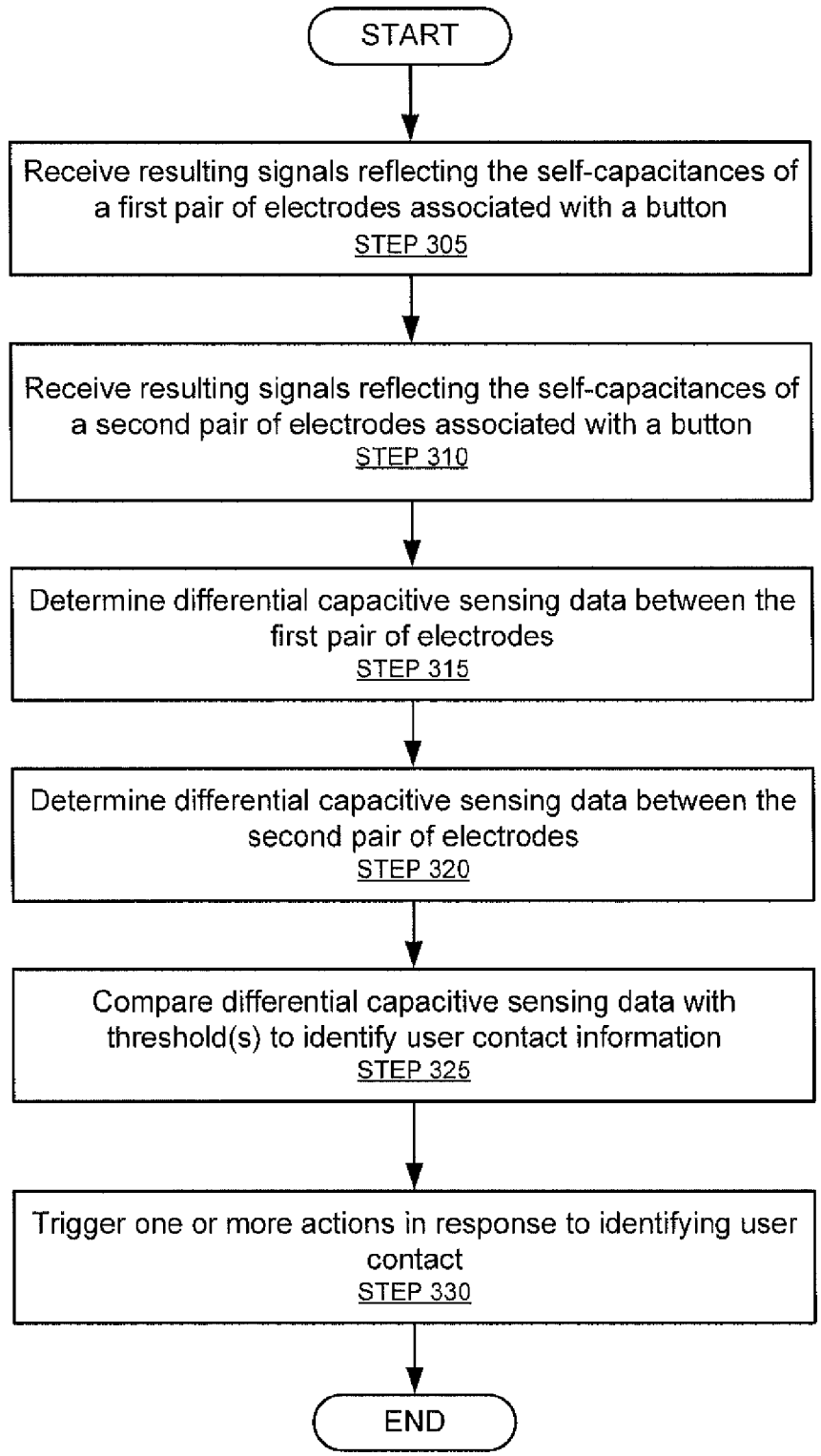
FIG. 3 and FIG. 4 show flowcharts in accordance with one or more embodiments of the invention.

FIG. 3 shows a flowchart in accordance with one or more embodiments of the invention. One or more of the steps in FIG. 3 may be performed by the components of the input device (100), discussed above in reference to FIG. 1. In addition, the steps in FIG. 3 may be partially performed by a processing system and partially performed a host device communicatively coupled to the processing system. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, resulting signals are obtained from a first pair of sensor electrodes (STEP 305) in a sensing region (e.g., sensing region (120)). The resulting signals reflect the self-capacitances of the sensor electrodes in the pair. As discussed above, the sensor electrodes in a matched pair will track each-other very closely over temperature changes, humidity changes, and aging. As also discussed above, the pair of sensor electrodes may fall within (i.e., are covered by) a button of the sensing region. For example, the first pair of sensor electrodes may correspond to sensor electrode A (202A) and sensor electrode A# (202A#), which fall within button 0 (210) (discussed above in reference to FIG. 2).

In STEP 310, resulting signals are received from a second pair of sensor electrodes. The resulting signals reflect the self-capacitances of the sensor electrodes in the second pair. The second pair of sensor electrodes may be adjacent to the first pair of sensor electrodes. The second pair of electrodes may be larger than the first pair of electrodes. Like the first pair of sensor electrodes, the second pair of sensor electrodes are matched. In one or more embodiments, only one sensor electrode in the second pair is covered by the button. For example, the second pair of sensor electrodes may correspond to sensor electrode B (202B) and sensor electrode B# (202B#) (discussed above in reference to FIG. 2). As shown in FIG. 2, only sensor electrode B (202B) is partially covered by button 0 (210), while both sensor electrode A (202A) and sensor electrode A# (202A#) are covered by button 0 (210).

In STEP 315, differential capacitive sensing data between the first pair of sensor electrodes is determined. This may include first measuring the self-capacitance of each sensor electrode in the pair (e.g., AbsRx0, AbsRx1) from the resulting signals, and then determining the difference between the measured self-capacitances (e.g., SAbsDeltaButtons0123a=AbsRx0−AbsRx1). As discussed above, the first pair of sensor electrodes are matched. Accordingly, if the user is not making contact with the button, SAbsDeltaButtons0123a may be approximately zero. However, if the user is making contact with the button, SAbsDeltaButtons0123a will likely be substantially more than zero.

In STEP 320, differential capacitive sensing data between the second pair of sensor electrodes is determined. This may include first measuring the self-capacitance of each sensor electrode in the pair (e.g., AbsTx0, AbsTx1) from the resulting signals, and then determining the difference between the measured self-capacitances (e.g., SAbsDeltaButtons01=AbsTx0−AbsTx1). As discussed above, the second pair of sensor electrodes are matched. Accordingly, as also discussed above, if the user is not making contact with the button, SAbsDeltaButtons01 may be approximately zero. However, if the user is making contact with the button, SAbsDeltaButtons01 will likely be substantially more than zero.

In STEP 325, the differential capacitive sensing data is compared with one or more predetermined thresholds to determine if there is user contact with the button. In one or more embodiments, the determination is made solely by comparing the differential capacitive sensing data between the first pair with a threshold. Specifically, if the differential capacitive sensing data (e.g., AbsDeltaButtons0123a) from the first pair satisfies (e.g., exceeds) the threshold, the user is deemed to be making contact with the button.

Those skilled in the art, having the benefit of this detailed description, will appreciate that if the user's contact is saturating (or equally straddling) both sensor electrodes in the first pair, SAbsDeltaButtons0123a may not satisfy the threshold even though the user is making contact with the button. Accordingly, in one or more embodiments, the differential capacitive sensing data between the second pair (e.g., SAbsDeltaButtons01) is also compared against a threshold. If the differential capacitive sensing data (e.g., SAbsDeltaButtons01) satisfies (e.g., exceeds) the threshold, the user is deemed to be making contact with the button, even though SAbsDeltaButtons0123a may be approximately zero. As discussed above, the sign of SAbsDeltaButtons01 may also be used to identify the button is being touched.

In STEP 330, one or more actions are triggered in response to identifying user contact. For example, user contact may trigger the mobile device or the touch screen of the mobile device to be activated. Additionally or alternatively, user contact may trigger the rearrangement of GUI widgets (e.g., icons, menus, etc.) on the touchscreen of the mobile device to make the widgets more accessible to the hand (e.g., left hand vs. right hand) that is gripping the mobile device.

In one or more embodiments, the process described in FIG. 3 is not limited to sensor electrode A (202A), sensor electrode A# (202A#), sensor electrode B (202B), and sensor electrode B# (202B#). For example, the first pair of electrodes may correspond to sensor electrode D (202D) and sensor electrode D# (202D#), while the second pair of sensor electrodes may correspond to sensor electrode E (202E) and sensor electrode E# (202E#). As another example, the first pair of sensor electrodes may correspond to sensor electrode C (202C) and sensor electrode C# (202C#), while the second pair of sensor electrodes may correspond to sensor electrode B (202B) and sensor electrode B#(202B). The process shown in FIG. 3 may be executed for each button in the sensing region.

Figure 4:
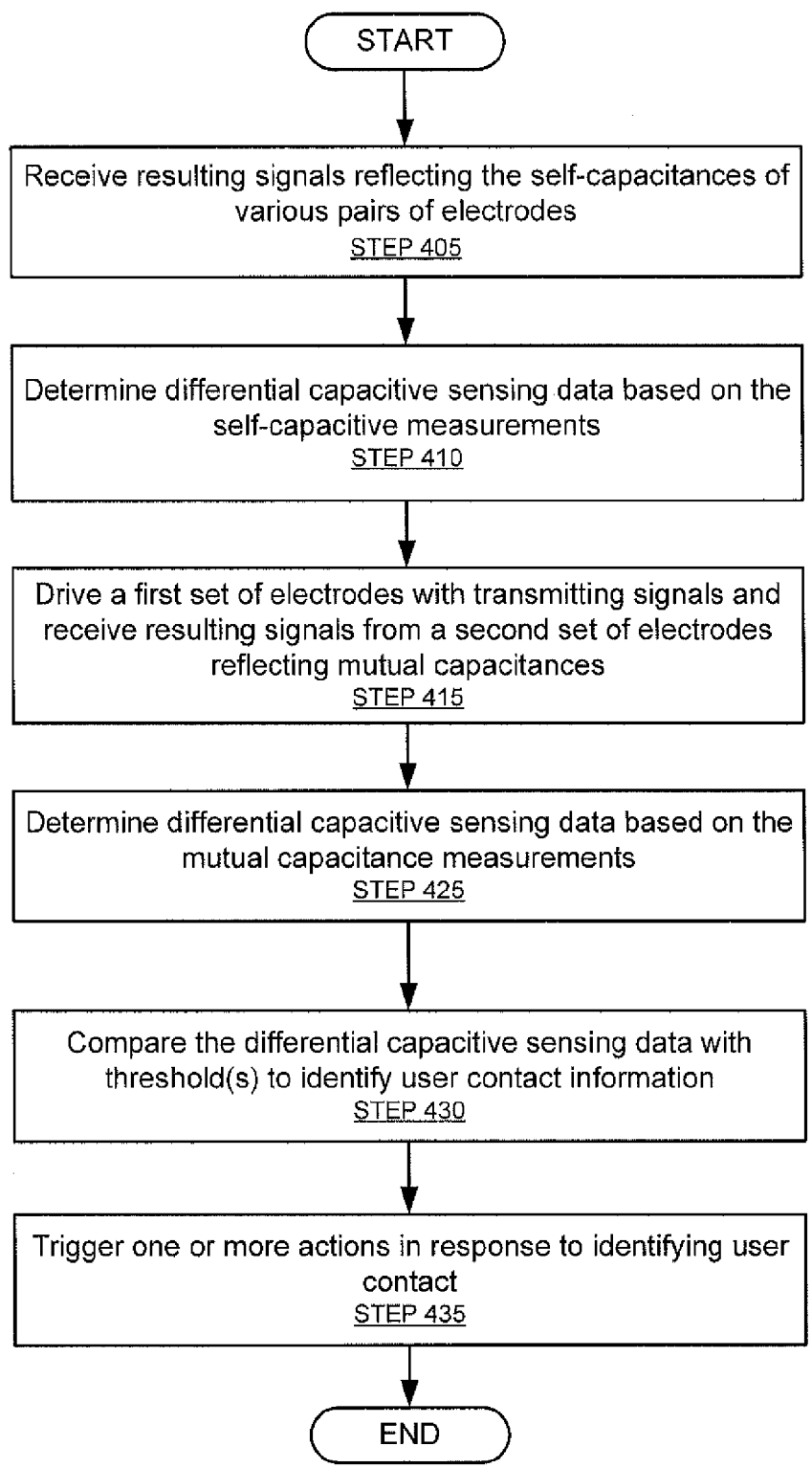

FIG. 4 shows a flowchart in accordance with one or more embodiments of the invention. One or more of the steps in FIG. 4 may be performed by the components of the input device (100), discussed above in reference to FIG. 1. In one or more embodiments of the invention, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

Initially, resulting signals are received from various matched pairs of sensor electrodes (STEP 405) in a sensor region (e.g., sensor region (120)). The resulting signals reflect the self-capacitances of the sensor electrodes. Some pairs of sensor electrodes may fall within (i.e., are covered by) a single button of a sensing region (e.g., sensing region (120)). For example, one of the pairs of sensor electrodes may correspond to sensor electrode A (202A) and sensor electrode A# (202A#), which fall solely within button 0 (210) (discussed above in reference to FIG. 2). Some pairs of sensor electrodes may fall within (i.e., are covered by) multiple buttons. For example, one of the pairs of sensor electrodes may correspond to sensor electrode B (202B) and sensor electrode B# (202B#), which are partially covered by button 0 (210) and button 1 (212) (discussed above in reference to FIG. 2).

In STEP 410, differential capacitive sensing data between each pair of sensor electrodes is determined. The differential capacitive sensing data is based on the self-capacitances of sensor electrodes in each pair. Accordingly, this may include first measuring the self-capacitance of each sensor electrode in each pair (e.g., AbsRx0, AbsRx1, AbsTx0, AbsTx1, AbsTx2, AbsTx3) from the resulting signals, and then determining the difference between the measured self-capacitances (e.g., SAbsDeltaButtons0123a=AbsRx0−AbsRx1; SAbsDeltaButtons01=AbsTx0−AbsTx1; SAbsDeltaButtons23=AbsTx2−AbsTx3).

In STEP 415, a first set of sensor electrodes are driven with transmitting signals, and resulting signals are received from a second set of sensor electrodes. The resulting signals reflect the mutual capacitances between the first set and the second set of sensor electrodes. For example, sensor electrode B (202B), sensor electrode B# (202B#), sensor electrode E (202E), sensor electrode E# (202E#) may be driven with transmitting signals. Resulting signals may be collected from trace Rx0 and trace Rx2 (discussed above in reference to FIG. 2). The resulting signals reflect the mutual capacitances: TransButton0a, TransButton0b, TransButton1a, TransButton1b, TransButton2a, TransButton2b, TransButton3a, and TransButton3b.

In STEP 425, differential capacitive sensing data based on the mutual capacitances is determined. Specifically, this may include calculating TransDeltaButton0, TransDeltaButton1, TransDeltaButton2, TransButton2b from the measured mutual capacitances.

In STEP 430, the differential capacitive sensing data is compared with one or more thresholds to identify user contact with one or more buttons in the sensing region. This may include first calculating the absolute value of each differential capacitive sensing data item: |SAbsDeltaButtons0123a|, |SAbsDeltaButtons01|, |SAbsDeltaButtons23|, |SAbsDeltaButtons0123b|, |TransDeltaButton0|, |TransDeltaButton1|, |TransDeltaButton2|, and |TransDeltaButton3|. If at least one of these absolute values exceeds a predefined touch threshold, then it is determined that user contact exists (although the actual button being touched might not yet be identified/isolated). If none of these absolute values exceeds the predefined touch threshold, then no user contact is declared.

Then, if one or more of |TransDeltaButton0|, |TransDeltaButton1|, |TransDeltaButton2|, and |TransDeltaButton3| exceed a predefined threshold, it is determined that the user is making contact with the corresponding button(s). In other words, |TransDeltaButton0|, |TransDeltaButton1|, |TransDeltaButton2|, and |TransDeltaButton3| are used to identify/isolate the button(s) that are being pressed/touched by the user.

Those skilled in the art, having the benefit of this detailed description, will appreciate that if a finger is saturating (or equally straddling) both sensor electrodes in a matched pair of sensor electrodes covered by a button, it is possible that none of |TransDeltaButton0|, |TransDeltaButton1|, |TransDeltaButton2|, and |TransDeltaButton3|) will exceed the threshold, even though the user is making contact with a button. In such embodiments, the touched button may be identified/isolated by |SAbsDeltaButtons01| or |SAbsDeltaButtons23|. If |SAbsDeltaButtons01| exceeds a threshold, the sign of SAbsDeltaButtons01 determines whether it is button 0 (210) or button 1 (212) that is being pressed/touched by the user. If |SAbsDeltaButtons23| exceeds the threshold, the sign of SAbsDeltaButtons23 determines whether it is button 2 (214) or button 3 (216) that is being touched/pressed by the user.

In STEP 435, one or more actions are triggered in response to identifying user contact. For example, user contact may trigger the mobile device or the touch screen of the mobile device to be activated. Additionally or alternatively, user contact may trigger the rearrangement of GUI widgets (e.g., icons, menus, etc.) on the touchscreen of the mobile device to make the widgets more accessible to the hand (e.g., left hand vs. right hand) that is gripping the mobile device.

Figure 5:
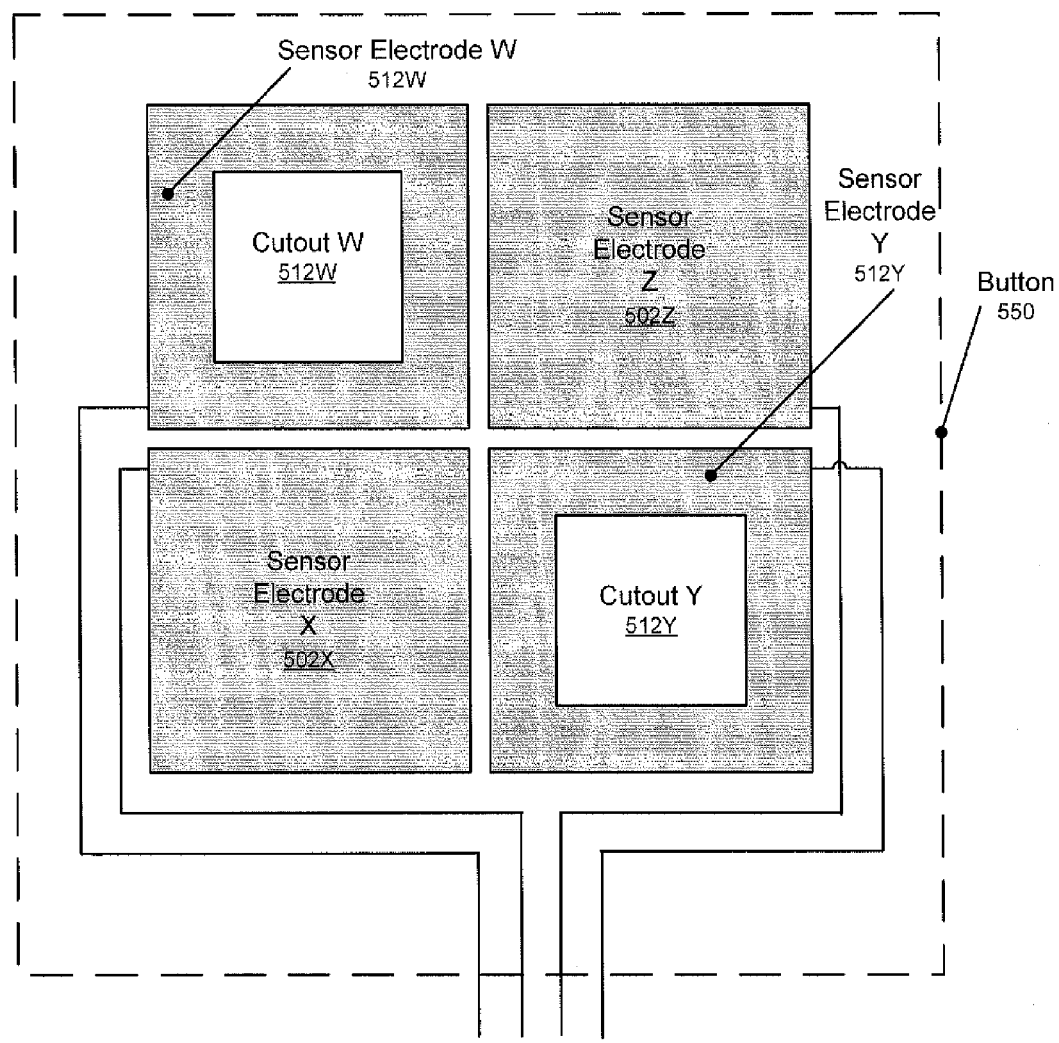
FIG. 5 shows an example button in accordance with one or more embodiments of the invention.

FIG. 5 shows an example button (550) in accordance with one or more embodiments of the invention. The button (550) may be included in a sensing region (e.g., sensing region (120)). As shown in FIG. 5, the button is composed of multiple sensor electrodes: sensor electrode W (502W), sensor electrode X (502X), sensor electrode Y (502Y), and sensor electrode Z (502Z). Each of the sensor electrodes (502W, 502X, 502Y, 502Z) may be substantially identical in material composition. Two of the sensor electrodes (i.e., sensor electrode W (502W), sensor electrode Y (502Y)) have cutouts (i.e., cutout W (512W), cutout Y (512Y)).

In one or more embodiments of the invention, the self-capacitance value of each sensor electrode (502W, 502X, 502Y, 502Z) is used to determine/identify user contact with the button. Let AbsW, AbsX, AbsY, and AbsZ correspond to the self-capacitance values of sensor electrode W (502W), sensor electrode X (502X), sensor electrode Y (502Y), and sensor electrode Z (502Z), respectively.

Let Touch Indicator=max [(AbsZ−AbsW), (AbsX−AbsW), (AbsZ−AbsY), (AbsX−AbsY)]. In other words, Touch Indicator is a function of multiple differential capacitive sensing data items (e.g., AbsZ−AbsW). Further, let Touch Signal=AbsW+AbsX+AbsY+AbsZ. Both Touch Indicator and Touch Signal may be calculated by a determination module (e.g., determination module (150)). Importantly, the embodiment described in FIG. 5 may be used to identify the presence of an input object that covers and saturates all of sensor electrodes W, X, Y, and Z.

In one or more embodiments of the invention, if Touch Indicator satisfies (i.e., exceeds) a threshold, it is determined that user contact with the button (550) exists. Touch Signal may be used to confirm the determination. Specifically, if touch signal also satisfies (i.e., exceeds) the same or a different threshold, then it is confirmed that the user is making contact with the button (550). One or more actions may be triggered in response to identifying user contact. For example, assuming button (550) is on a mobile device, user contact may trigger the mobile device or the touch screen of the mobile device to be activated. Additionally or alternatively, user contact may trigger the rearrangement of GUI widgets (e.g., icons, menus, etc.) on the touchscreen of the mobile device to make the widgets more accessible to the hand (e.g., left hand vs. right hand) that is gripping the mobile device.

Various embodiments of the invention may have one or more of the following advantages: the ability to eliminate mechanical buttons on mobile devices; the ability to replace mechanical buttons with capacitance buttons on a mobile device; the ability to use capacitive buttons without a known baseline; the ability to power on a mobile device or a screen of the mobile device by gripping the mobile device; the ability to handle scenarios in which a user's finger saturates or equally straddles a matched pair of sensor electrodes; etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for a capacitive sensing device, comprising:
a sensor module coupled to a plurality of sensor electrodes and configured to receive a first plurality of resulting signals from the plurality sensor electrodes, wherein the first plurality of resulting signals reflect self-capacitances of the plurality of sensor electrodes, and
wherein the plurality of sensor electrodes comprises a first sensor electrode, a second sensor electrode adjacent to the first second electrode, a third sensor electrode adjacent to the first sensor electrode and the second sensor electrode, and a fourth sensor electrode adjacent to the third sensor electrode; and
a determination module configured to:
determine, based on the first plurality of resulting signals, first differential capacitive sensing data between the first sensor electrode and the second sensor electrode,
wherein the first differential capacitive sensing data is a difference between the self-capacitance of first sensor electrode and the self-capacitance of the second sensor electrode;
determine, based on the first plurality of resulting signals, second differential capacitive sensing data between the third sensor electrode and the fourth sensor electrode,
wherein the second differential capacitive sensing data is a difference between the self-capacitance of the third sensor electrode and the self-capacitance of the fourth sensor electrode; and
determine user contact information based on at least one of the first differential capacitive sensing data and the second differential capacitive sensing data.

2. The processing system of claim 1, wherein the determination module is further configured to:
identify, in response to the first differential capacitive sensing data exceeding a threshold, user contact with a button associated with the first electrode and the second electrode.

3. The processing system of claim 1, wherein the determination module is further configured to:
identify, in response to the first differential capacitive sensing data being less than a first threshold and the second differential capacitive sensing data exceeding a second threshold, user contact with a button associated with the first electrode and the second electrode.

4. The processing system of claim 1, wherein:
the plurality of sensor electrodes further comprises a fifth sensor electrode and a sixth sensor electrode adjacent to the fourth sensor electrode;
the sensor module is further configured to:
drive the fourth sensor electrode with a plurality of transmitting signals; and
receive a second plurality of resulting signals from the fifth sensor electrode and the sixth sensor electrode based on the plurality of transmitting signals;
the second plurality of resulting signals reflect mutual-capacitance measurements between the fourth electrode and at least one of the fifth sensor electrode and the sixth sensor electrode;
the determination module is further configured to determine, based on the second plurality of resulting signals, third differential capacitive sensing data; and
user contact information is determined further based on the third differential capacitive sensing data.

5. The processing system of claim 1, wherein the plurality of sensor electrodes are located on the side of a mobile device.

6. The processing system of claim 1, wherein:
the plurality of electrodes further comprises a fifth sensor electrode adjacent to a sixth sensor electrode;
the fifth electrode is further adjacent to two or more of the first sensor electrode, the second sensor electrode, the third sensor electrode, and the fourth sensor electrode;
the determination module is further configured to determine third differential capacitive sensing data between the fifth sensor electrode and the sixth sensor electrode; and user contact information is further based on the third differential capacitive sensing data.

7. The processing system of claim 6, wherein the determination module is further configured to:
identify user contact with a button associated with the first electrode and the second electrode in response to the first differential capacitive sensing data being less than a first threshold, the second differential capacitive sensing data being less than a second threshold, and the third differential capacitive sensing data exceeding a third threshold.

8. The processing system of claim 1, wherein:
the sensor module is further configured to:
drive the third sensor electrode with a plurality of transmitting signals; and
receive a second plurality of resulting signals from the first sensor electrode and the second sensor electrode based on the plurality of transmitting signals;
the second plurality of resulting signals reflect mutual-capacitance measurements between the third sensor electrode and at least one of the first sensor electrode and the second sensor electrode;
the determination module is further configured to determine, based on the second plurality of resulting signals, third differential capacitive sensing data; and
user contact information is determined further based on the third differential capacitive sensing data.

9. A method for operating a capacitive sensing device, comprising:
receiving a plurality of resulting signals from a plurality of sensor electrodes,
wherein the first plurality of resulting signals reflect self-capacitance values of the plurality of sensor electrodes, and
wherein the plurality of sensor electrodes comprises a first sensor electrode, a second sensor electrode adjacent to the first second electrode, a third sensor electrode adjacent to the first sensor electrode and the second sensor electrode, and a fourth sensor electrode adjacent to the third sensor electrode;
determining, based the first plurality of resulting signals, first differential capacitive sensing data between the first sensor electrode and the second sensor electrode,
wherein the first differential capacitive sensing data is a difference between the self-capacitance of first sensor electrode and the self-capacitance of the second sensor electrode;
determining, based on the first plurality of resulting signals, second differential capacitive sensing data between the third sensor electrode and the fourth sensor electrode,
wherein the second differential capacitive sensing data is a difference between the self-capacitance of the third sensor electrode and the self-capacitance of the fourth sensor electrode; and
determining user contact information based on at least one of the first differential capacitive sensing data and the second differential capacitive sensing data.

10. The method of claim 9, wherein determining user contact information comprises:
comparing the first differential capacitive sensing data with a threshold; and
identifying, in response to the first differential capacitive sensing data exceeding the threshold, user contact with a button associated with the first electrode and the second electrode.

11. The method of claim 9, wherein determining user contact information comprises:
comparing the first differential capacitive sensing data with a first threshold;
comparing the second differential capacitive sensing data with a second threshold; and
identifying, in response to the first differential capacitive sensing data being less than the first threshold and the second differential capacitive sensing data exceeding the second threshold, user contact with a first button associated with the first electrode and the second electrode.

12. The method of claim 9, further comprising:
driving the third sensor electrode with a plurality of transmitting signals;
receiving a second plurality of resulting signals from the first sensor electrode and the second sensor electrode based on the plurality of transmitting signals,
wherein the second plurality of resulting signals reflect mutual-capacitance values between the third sensor electrode and at least one of the first sensor electrode and the second sensor electrode; and
determining, based the second plurality of resulting signals, third differential capacitive sensing data,
wherein user contact information is determined further based on the third differential capacitive sensing data.

13. The method of claim 9, further comprising:
rearranging a plurality of widgets on a graphical user interface (GUI) based on the user contact information, wherein the GUI is located on a mobile device, and the plurality of electrodes are located on a side of the mobile device.

14. An input device, comprising:
a plurality of sensor electrodes comprising:
a first sensor electrode;
a second sensor electrode adjacent to the first second electrode;
a third sensor electrode adjacent to the first sensor electrode and the second sensor electrode; and
a fourth sensor electrode adjacent to the third sensor electrode; and
a processing system operatively connected to the plurality of sensor electrodes and configured to:
receive a first plurality of resulting signals from the plurality sensor electrodes, wherein the first plurality of resulting signals reflect self-capacitance values of the plurality of sensor electrodes;
determine, based the first plurality of resulting signals, first differential capacitive sensing data between the first sensor electrode and the second sensor electrode,
wherein the first differential capacitive sensing data is a difference between the self-capacitance of first sensor electrode and the self-capacitance of the second sensor electrode;
determine, based on the first plurality of resulting signals, second differential capacitive sensing data between the third sensor electrode and the fourth sensor electrode,
wherein the second differential capacitive sensing data is a difference between the self-capacitance of the third sensor electrode and the self-capacitance of the fourth sensor electrode; and
determine user contact information based on at least one of the first differential capacitive sensing data and the second differential capacitive sensing data.

15. The input device of claim 14, wherein the processing system is further configured to:
identify, in response to the first differential capacitive sensing data being less than a first threshold and the second differential capacitive sensing data exceeding a second threshold, user contact with a button associated with the first electrode and the second electrode.

16. The input device of claim 14, wherein the plurality of sensors is located on a side of a mobile device.

17. The input device of claim 14, wherein:
the plurality of electrodes further comprises a fifth sensor electrode adjacent to a sixth sensor electrode;
the fifth electrode is further adjacent to two or more of the first sensor electrode, the second sensor electrode, the third sensor electrode, and the fourth sensor electrode;
the processing system is further configured to determine third differential capacitive sensing data between the fifth sensor electrode and the sixth sensor electrode; and
user contact information is further based on the third differential capacitive sensing data.

18. The input device of claim 17, wherein the processing system is further configured to:
identify user contact with a button associated with the first electrode and the second electrode in response to the first differential capacitive sensing data being less than a first threshold, the second differential capacitive sensing data being less than a second threshold, and the third differential capacitive sensing data exceeding a third threshold.

19. The input device of claim 14, wherein the processing system is further configured to:
drive the third sensor electrode with a plurality of transmitting signals;
receive a second plurality of resulting signals from the first sensor electrode and the second sensor electrode based on the plurality of transmitting signals,
wherein the second plurality of resulting signals reflect mutual-capacitance values between the third sensor electrode and at least one of the first sensor electrode and the second sensor electrode; and
determine, based the second plurality of resulting signals, third differential capacitive sensing data,
wherein user contact information is determined further based on the third differential capacitive sensing data.

* * * * *